United States Patent [19]

Lehmann et al.

[11] 4,166,002

[45] Aug. 28, 1979

[54] POLYAMINES CONTAINING ACID GROUPS THAT ARE USEFUL IN PAPERMAKING

[75] Inventors: Wolfgang Lehmann, Leverkusen; Gerhard Troemel, Persch; Kurt Ley; Friedhelm Müller, both of Odenthal, all of Fed. Rep. of Germany

[73] Assignee: Bayer Aktiengesellschaft, Leverkusen, Fed. Rep. of Germany

[21] Appl. No.: 528,324

[22] Filed: Nov. 29, 1974

Related U.S. Application Data

[62] Division of Ser. No. 305,320, Nov. 10, 1972, Pat. No. 3,932,363.

[30] Foreign Application Priority Data

Nov. 12, 1971 [DE] Fed. Rep. of Germany ....... 2156215

[51] Int. Cl.$^2$ .............................................. D21H 3/58
[52] U.S. Cl. ......................... 162/164 R; 162/164 EP; 162/168 R; 162/168 NA; 162/190
[58] Field of Search ............... 162/164, 168, 189, 190; 260/78 SC, 29.2 EP, 29.2 N, 2 BP, 79.5 NV

[56] References Cited

U.S. PATENT DOCUMENTS

| | | | |
|---|---|---|---|
| 2,989,364 | 6/1961 | Goldann | 260/78 SC |
| 3,240,761 | 3/1966 | Keim | 162/164 |
| 3,408,292 | 10/1968 | Dajani | 210/54 |
| 3,468,818 | 9/1969 | Phillips | 162/164 |
| 3,632,559 | 1/1972 | Matter et al. | 162/164 |
| 3,640,909 | 2/1972 | Jones et al. | 210/54 |

FOREIGN PATENT DOCUMENTS

| | | | |
|---|---|---|---|
| 979461 | 1/1965 | United Kingdom | 260/78 SC |
| 996388 | 6/1965 | United Kingdom | 162/164 |

Primary Examiner—S. Leon Bashore
Assistant Examiner—William F. Smith
Attorney, Agent, or Firm—Plumley & Tyner

[57] ABSTRACT

Water-soluble polyamines which (a) have an average molecular weight of above 1,000, (b) contain at least one grouping of the formula $$-R-Z$$

in which
Z denotes a —COOH or —SO$_3$H group and
R represents an alkylene radical, possessing 1 to 7 C atoms, which is optionally substituted and/or interrupted by a carbonamido group, bonded to a basic nitrogen atom, and which (c) are obtainable either by reaction of water-soluble low molecular polyamines with compounds which introduce acid groups and with compounds which are polyfunctional towards amino groups, or by reaction of water-soluble higher-molecular polyamines, having an amine equivalent of 43 to 700, in which a hydrogen atom is bonded to at least every twentieth basic nitrogen atom, with compounds which introduce acid groups and optionally with compounds which are polyfunctional towards amino groups; a process for their manufacture and their use as agents for increasing the retention of fibres, fillers and pigments in the manufacture of paper and for working-up papermaking machine effluents by filtration, sedimentation and flotation.

14 Claims, No Drawings

POLYAMINES CONTAINING ACID GROUPS THAT ARE USEFUL IN PAPERMAKING

This is a Division of application Ser. No. 305,320, filed Nov. 10, 1972 now U.S. Pat. No. 3,932,363.

The invention relates to water-soluble polyamines; more particularly it concerns water-soluble polyamines which (a) have an average molecular weight of above 1,000, preferably above 5,000, (b) contain at least one grouping of the formula $$-R-Z$$

in which

Z denotes a —COOH or —SO$_3$H group and

R represents an alkylene radical, possessing 1 to 7 C atoms, which is optionally substituted and/or interrupted by a carbonamido group, bonded to a basic nitrogen atom, and which (c) are obtainable either by reaction of water-soluble low molecular polyamines with compounds which introduce acid groups and with compounds which are polyfunctional towards amino groups, or by reaction of water-soluble higher-molecular polyamines, having an amine equivalent of 43 to 700, in which a hydrogen atom is bonded to at least every twentieth basic nitrogen atom, with compounds which introduce acid groups and optionally with compounds which are polyfunctional towards amino groups.

The invention further relates to a process for the manufacture of these water-soluble polyamines and to their use as agents for increasing the retention of fibres, fillers and pigments in the manufacture of paper and for working-up papermaking machine effluents by filtration, sedimentation and flotation.

To manufacture the water-soluble polyamines according to the invention it is possible to use both low molecular polyamines, that is to say polyamines of which the average molecular weight is less than 10,000, and water-soluble higher-molecular polyamines, that is to say polyamines of which the average molecular weight is greater than 10,000.

As examples of low molecular polyamines there may be mentioned: cycloaliphatic and araliphatic polyamines, such as 1,4-diamino-cyclohexane, 1-aminomethyl-5-amino-1,3,3-trimethyl-cyclohexane, 1,3-bis-aminomethylbenzene and benzyl-bis-(3-aminopropyl)-amine, but especially:

(A) polyamines of the formula $$H-N(R_1)-(C_nH_{2n}-N)_m-H \quad (R_2) \qquad I$$

in which

R$_1$ and R$_2$ independently of one another denote hydrogen or a C$_1$–C$_4$-alkyl radical which is optionally substituted by a hydroxyl, nitrile or carbonamido group, m denotes a number which is at least 1, preferably 1 to 4 and n denotes a number which is at least 2, preferably 2 to 4.

Representatives of these polyamines are, for example, ethylenediamine, propylenediamine, tetramethylenediamine, hexamethylenediamine, diethylenetriamine, dipropylenetriamine, triethylenetetramine, tetraethylenepentamine, pentaethylenehexamine, N,N'-dimethylethylenediamine, N-β-hydroxyethyl-ethylenediamine, N-β-cyanoethylethylenediamine and N-β-carbamidoethyl-ethylenediamine.

(B) Polyamines of the formula $$Y-[(CH_2-CHR_3-CH_2-NH)_x-H]_z \qquad II$$

in which

Y represents oxygen, sulphur or the radical of an at least divalent aliphatic, cycloaliphatic, araliphatic or aromatic compound possessing hydroxyl and/or sulphhydryl groups, R$_3$ denotes hydrogen or the methyl group, x denotes an integer which is at least 1 and preferably 1–3 and z represents an integer which is at least 2 and preferably 2–4.

Examples of representatives of these polyamines are bis-[3-amino-propyl]-ether, bis-[3-aminopropyl]-sulphide, ethylene glycol-bis-[3-amino-propyl-ether], dithioethyleneglycol-bis-[3-aminopropyl-ether], neopentylene-glycol-bis-[3-amino-propyl-ether], hexahydro-p-xylylene-glycol-bis-[3-amino-propyl-ether] and hydroquinone-bis-[3-amino-propylether].

(C) Polyamines of the formula

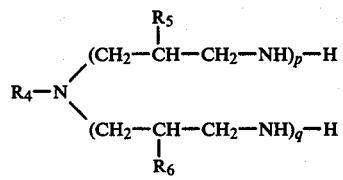

in which

R$_4$ represents a C$_1$–C$_{18}$-alkyl radical which is optionally substituted by an amino or hydroxyl group and R$_5$ and R$^6$ independently of one another represent hydrogen or a methyl group and p+q is a number which is 1 to 20, preferably 2 to 5.

Examples of these polyamines are ethyl-bis-(3-amino-propyl)-amine, 2-hydroxyethyl-bis-(3-amino-propyl)-amine, n-butyl-bis-(3-amino-propyl)-amine, tris-(3-amino-propyl)-amine and above all methyl-bis-(3-amino-propyl)-amine.

(D) Further, the known polyamines containing amide groups, especially the reaction products from;

(a) cycloaliphatic, araliphatic or heterocyclic, preferably aliphatic, polyamines, which contain at least two amino groups capable of amide formation and at least one further primary, secondary or tertiary amino group; these polyamines can optionally be present mixed with aliphatic, cycloaliphatic, araliphatic or heterocyclic diamines containing primary or secondary amino groups, with the amount of these diamines advantageously being so chosen that up to 20 mol % of diamines are present per mol of the further primary, secondary or tertiary amino groups present in the polyamines in excess over the minimum of two amino groups capable of amide formation;

(b) aliphatic or aromatic dicarboxylic acids, especially saturated aliphatic dicarboxylic acids containing 4 to 10 carbon atoms or their functional derivatives, such as anhydrides, esters, half-esters or amides, and optionally (c) aminocarboxylic acids containing at least 3 carbon atoms, or their lactams, especially ε-caprolactam.

These reaction products are described in the literature as "polyamide-amines" or "polyamido-amines" or "polyamide-polyamines" or "polyaminopolyamides".

(E) Further, polyamines containing amide groups, to which 1,2-polyalkylenepolyamine side chains have been grafted by reaction with 1,2-alkyleneimines, these polyamines being described, for example, in German Offenlegungsschrift (German Published Specification) No. 1,802,435.

As examples of water-soluble higher-molecular polyamines which have an amine equivalent of 43 to 700 and in which a hydrogen atom is bonded to at least every twentieth basic nitrogen atom, which can be the basis of the reaction product according to the invention, there may be mentioned: the known polymerisation products of ethyleneimine and the previously known reaction products of the abovementioned low molecular polyamines, especially the polyamines containing amide groups, with compounds which are polyfunctional towards amino groups. Such reaction products are described, for example, in German Pat. Nos. 665,791, 872,269, 897,015, 916,468 and 1,006,155; German Auslegeschrift (German Published Specification) No. 1,211,922; Belgian Pat. Nos. 730,544 and 736,162; British Pat. No. 775,721; and U.S. Pat. Nos. 2,969,302 and 3,329,657.

The reaction of the water-soluble polyamines, both of the low molecular polyamines and of the higher-molecular polyamines, with the compounds which introduce acid groups is usually carried out by adding the compounds which introduce acid groups to the 10 to 60% strength aqueous solutions of the polyamines and subsequently allowing the resulting reaction mixtures to react for about 2 to 20 hours at temperatures of 40° to 100° C. and at a pH-value of above 7.0, preferably 8 to 10. The pH-value is adjusted to the desired value by adding aqueous alkali.

Suitable compounds which introduce acid groups are all compounds which in aqueous media, at 20° to 100° C., are capable of reacting with amino groups to form such amines as contain a grouping of the formula

—R—Z in which Z denotes a —COOH or —SO$_3$H group and R represents an alkylene radical which has 1 to 7 C-atoms and is optionally substituted and/or interrupted by a carbonamido group, preferably an C$_1$–C$_5$-alkylene radical which is optionally substituted by a methyl or carbonyl group and/or interrupted by a carbonamido group. Such compounds which introduce acid groups are, in particular, alkanesultones, such as propanesultone or butanesultone; $\alpha$, $\beta$-unsaturated acids, such as vinylsulphonic acid, or $\alpha$,$\beta$-unsaturated monocarboxylic or dicarboxylic acids, for example acrylic, methacrylic, maleic and itaconic acid; derivatives of these $\alpha$,$\beta$-unsaturated acids which possess acid groups, for example 2-acrylamido-2,2-dimethylethanesulphonic acid, and 1- or 2-halogeno-fatty acids, such as 2-chloropropionic acid and above all chloroacetic acid. The acids can be employed in the form of their salts.

The ratios of the amounts of the compounds which introduce acid groups to the amounts of the polyamines are appropriately so chosen that 0.05 to 0.9 equivalent, especially 0.05 to 0.6 equivalent, preferably 0.15 to 0.6 equivalent, of acid groups is introduced per equivalent of the basic amino groups contained in the polyamines.

The low molecular polyamines containing acid groups can be reacted in the same manner as low molecular polyamines free of acid groups with compounds which are polyfunctional towards amino groups to give the polyamines according to the invention, with molecular weights of above 1,000, preferably above 5,000.

Suitable compounds, polyfunctional towards amino groups, for the manufacture of the polyamines according to the invention are in particular those polyfunctional compounds which are capable of reacting completely with the amino groups contained in the basic polyamides in aqueous solution at pH-values of above 6, preferably above 8.

As examples of compounds which are polyfunctional towards amino groups there may be mentioned: bifunctional compounds, such as $\alpha,\omega$-alkanedihalides, for example 1,2-dichloroethane, 1,2-dibromoethane, 1,2-dichloropropane, 1,3-dichloropropane and 1,6-dichlorohexane; $\omega,\omega'$-dihalogenoethers, for example 2,2′-dichloro-diethyl-ether, bis-($\beta$-chloro-isopropyl)-ether, and bis-(4-chloro-butyl-ether); halogenohydrins and epihalogenohydrins, for example epichlorohydrin, 1,3-dichloropropanol-(2), bis-(3-chloro-2-hydroxypropyl)-ether and 1,4-dichloro-2,3-epoxy-butane; bis-epoxy compounds, for example 1,2,3,4-diepoxybutane, diglycidylether, ethane-1,2-bis-glycidyl-ether and butane-1,4-bis-glycidyl-ether; $\omega$-halogenocarboxylic acid halides, for example chloroacetyl chloride, 2-chloropropionyl chloride, 3-chloropropionyl chloride and 3-bromopropionyl bromide; vinyl compounds, for example divinyl-ether, divinylsulphone and methylene-bis-acrylamide; further, 4-chloromethyl-1,3-dioxolanone-(2) and 2-chloroethyl-chloroformic acid ester, and also chloroformic acid esters, 3-chloro-2-hydroxypropylethers and glycidyl-ethers of polyalkylene oxides, for example polyethylene oxides, and of reaction products of 1 to 50 mols of alkylene oxides such as ethylene oxide and/or propylene oxide, with 1 mol of dihydric or polyhydric polyols or of other compounds containing at least two active hydrogen atoms; trifunctional compounds, such as N,N'-triacryloylhexahydro-s-triazine.

The ratios of the amounts of the polyfunctional compounds to the amounts of the low molecular polyamines containing acid groups are appropriately so chosen that the minimum amounts required in order to increase the molecular weight of the low molecular polyamines several-fold are not significantly exceeded. The minimum amounts of compounds which are polyfunctional towards amino groups, which have to be employed in order to obtain reaction products of the desired high molecular weight or solutions thereof having the desired viscosity, depend mainly on the molecular weight of the low molecular polyamines on which the products are based and can easily be ascertained from case to case by preliminary experiments.

The manufacture of the polyamines containing acid groups, according to the invention, from low molecular polyamines containing acid groups can be carried out in accordance with processes which are in themselves known, preferably by stirring mixtures of the low molecular polyamines containing acid groups and the compounds which are polyfunctional towards amino groups in aqueous media at pH-values of above 6 and at temperatures of between 0° and 95° C. until a sample of the reaction mixture, in the form of a 10% strength aqueous solution, shows a viscosity of at least 10 cP at 25° C. The total concentration of the components in the aqueous reaction mixture should be 10 to 50 percent by weight. However, the compounds which are polyfunctional towards the amino groups can also be gradually added in portions to the aqueous polyamine solution. The content of reaction products in the reaction solution, which is preferably between 10 and 30 percent by weight, is then adjusted to the desired final value by dilution with water, if the reaction has been carried out at a higher concentration. In some cases it is necessary, in order to terminate the reaction after reaching the desired viscosity, to adjust the pH-value of the reaction solution to pH 6, preferably to 4–5, by adding acids, for example hydrochloric acid, sulphuric acid, phosphoric acid or acetic acid. This is above all the case where the minimum amount of polyfunctional compounds required to increase the molecular weight of the low molecular polyamines, containing acid groups, severalfold has been significantly exceeded.

It is however also possible to carry out the reaction of the low molecular polyamines with the compounds which introduce acid groups and the polyfunctional compounds in a one-step reaction, in which it is possible not only to add the two compounds simultaneously but also to add them alternately.

Furthermore it can be advisable in some cases to react the higher-molecular polyamines, containing acid groups, which are obtained by reaction of the water-soluble higher-molecular polyamines with the compounds which introduce acid groups, once again with chain lengthening agents, that is to say with compounds which are polyfunctional towards amino groups, in order to obtain water-soluble polyamines containing acid groups and having an even higher molecular weight.

The polyamines according to the invention are characterised by an average minimum molecular weight of 1,000, preferably 5,000. The upper limit of their molecular weight is determined by their property of being water-soluble. A numerical description of the upper limit of their molecular weight is not possible since this depends greatly on the polyamines on which they are based and on the number of groups contained therein which confer solubility in water.

When using the polyamines according to the invention as auxiliaries for increasing the retention of fibres, fillers and pigments, the procedure followed, in a manner which is in itself known, is to add the polyamines according to the invention, in the form of dilute aqueous solutions, to the paper raw material suspension before the stuff box, the point of introduction being so chosen that good distribution of the auxiliary in the raw material suspension is ensured but an excessive contact time is avoided. The amounts of polyamines which are required to achieve the desired retention action and/or of draining off water more quickly can without difficulties be determined by preliminary experiments; in general it is advisable to use 0.005 to 0.5 percent by weight of polyamines, relative to the dry weight of the paper. The addition of polyamines according to the invention before the stuff box of a papermaking machine furthermore has an advantageous effect on the processing of the papermaking machine effluents by filtration, flotation or sedimentation; the coagulating action of the polyamines according to the invention facilitates very considerably the removal of paper pulp particles from the papermaking machine effluent.

When using the polyamines according to the invention as auxiliaries in processing papermaking machine effluents by filtration, flotation or sedimentation it is again possible to proceed in a manner which is in itself known, preferably by adding the reaction products in question, in the form of dilute aqueous solutions, to the papermaking machine effluent, appropriately before it enters the pulp trap.

The amounts of polyamines which produce adequate coagulation of the paper raw material components contained in the papermaking machine effluents should be chosen in accordance with the composition of the effluents and can easily be determined from case to case by preliminary experiments; in general, amounts of 0.005 to 2 g of polyamine per $m^3$ of effluent are adequate for this purpose.

In comparison with the products free of acid groups, the polyamines which contain acid groups, according to the invention, show the advantage of having less effect on optical whiteners—the papers show a higher degree of whiteness—and, suprisingly, of giving a higher retention effect in the majority of cases. The higher degree of whiteness manifests itself particularly if the polyamines containing acid groups are employed in such amounts that an equally high retention of fillers, fibres and pigments is achieved as when using the polyamines free of acid groups. The high compatibility with the cationic or non-ionic additives which are customary in paper manufacture, for example wet strength agents, natural or synthetic solvents and water-soluble dyestuffs, permits the polyamines to be used universally.

Some polyamines according to the invention and their use for increasing the retention of fibres, fillers and pigments in the manufacture of paper are described below by way of examples.

Polyamine 1

(a) 1,000 g of a 30% strength aqueous solution of a polyamide-polyamine manufactured from 1.05 mol of diethylenetriamine, 1.0 mol of adipic acid and 0.5 mol of ε-caprolactam (viscosity: 24 cP at 25° C.; equivalent: 758) are treated with 38.35 g of sodium chloroacetate (0.25 mol/equivalent) at room temperature, whilst stirring. When the salt has dissolved, the solution is heated to 60° C. and is stirred at this temperature for a further 10 hours, whilst neutralising the hydrochloric acid split off during the reaction by addition of 50% strength KOH (amount required: 22.5 g). The solution is adjusted to 25% strength by adding 139.15 ml of water.

(b) A mixture of 1,000 g of this 25% strength polyamideamine solution, 262 ml of water and 6.4 g of epichlorohydrin (0.063 mol/amine-equivalent) is stirred at 70° C. until the viscosity of the solution no longer increases (about 9 hours). The 20% strength solution, thus obtained, of the polyamine formed has a pH-value of 8.0 and a viscosity of 573 cP at 25° C.

Polyamine 2

(a) The low molecular polyamine containing acid groups was manufactured as described under polyamine (1a) except that 76.7 g of sodium chloroacetate (0.5 mol/equivalent) were employed and 45.0 g of 50% strength KOH were used for neutralising the reaction mixture and 78.3 ml of water were used for dilution.

(b) The reaction of the low molecular polyamine (2a), containing acid groups, with epichlorohydrin was carried out as described under polyamine (1b) except that 6.8 g of epichlorohydrin (0.067 mol/amine-equivalent) and 264 ml of water were used. The 20% strength solution, thus obtained, of the polyamine formed has a pH-value of 8.0 and a viscosity of 566 cP at 25° C.

Polyamine 3

(a) The low molecular polyamine containing acid groups was manufactured as described under polyamine (1a) except that 115.05 g of sodium chloroacetate (0.75 mol/equivalent) were employed and 67.5 g of 50% strength KOH were used for neutralising the reaction mixture and 17.45 ml of water were used for dilution.

(b) The reaction of the low molecular polyamine (3a), containing acid groups, with epichlorohydrin was carried out as described under polyamine (1b) except that 7.1 g of epichlorohydrin (0.070 mol/amine-equivalent) and 266 ml of water were used. The 20% strength solution, thus obtained, of the polyamine formed has a pH-value of 8.0 and a viscosity of 587 cP at 25° C.

Comparison Product I

Comparison Product I, which in contrast to the polyamines 1b, 2b and 3b does not contain any acid groups, was obtained from the 30% strength aqueous polyamide-polyamine solution used for the manufacture of polyamine 1a (viscosity 24 cP at 25° C.; equivalent 758) by chain lengthening with epichlorohydrin analogously to polyamine 1b, 2b or 3b. The 20% strength aqueous solution of the chain-lengthened polyamide-polyamine which is free of acid groups had a viscosity of 472 cP at 25° C. This comparison product is a product according to Belgian Pat. No. 736,162.

Polyamine 4

(a) 1,000 g of a 50% strength aqueous solution of a polyamide-amine manufactured from 1.025 mol of diethylenetriamine and 1.0 mol of adipic acid (viscosity: 420 cP at 25° C.; equivalent: 374) are treated with 109 g of sodium chloroacetate (0.35 mol/equivalent) at room temperature, whilst stirring. After the salt has dissolved, the solution is heated to 80° C. and is stirred for a further 2 hours at this temperature, whilst adding sufficient 50% strength KOH to maintain a pH-value of 11.0 (requisite amount: 110 g). The solution is adjusted to 40% strength by adding 31 ml of water.

(b) 700 ml of water are added to 1,000 g of this 40% strength polyamide-polyamine solution, after which 19.8 g of epichlorohydrin (0.1 mol/equivalent) are slowly added at room temperature, whilst stirring. The temperature is then raised to 60° C. and the solution is further stirred at this temperature until the viscosity has risen to about 450 cP (about 5 hours). Thereafter the solution is treated with 236 g of water and 104 g of concentrated HCl and cooled. The 20% strength clear aqueous solution, thus obtained, of the reaction product formed has a pH-value of 4.5 and a viscosity of 420 cP at 25° C.

Polyamine 5

A mixture of 1,000 g of the 40% strength polyamideamine solution described under polyamine (4a), 700 ml of water and 32 g of 1,2-dichloroethane (0.15 mol/equivalent) is stirred at 80° to 85° C. in a reaction vessel with reflux condenser until the viscosity of the reaction solution has risen to about 420 cP at 85° C. (after about 10 hours). Thereafter the solution is treated with 128 g of concentrated hydrochloric acid and 182 g of water and cooled. The 20% strength aqueous solution, thus obtained, of the polyamine formed has a pH-value of 4.5 and a viscosity of 380 cP at 25° C.

Comparison Product II

Comparison product II, which in contrast to the polyamines 4b and 5 does not contain any acid groups, was obtained from the 50% strength aqueous polyamide-polyamine solution employed for the manufacture of polyamine (4a) (viscosity: 420 cP at 25° C.; equivalent: 374) by chain lengthening with epichlorohydrin analogously to polyamine (4b). The 20% strength aqueous solution of the chain-lengthened polyamide-polyamine, which is free of acid groups, had a viscosity of 410 cP at 25° C. This comparison product is a product according to German Offenlegungsschrift (German Published Specification) No. 1,495,058 = U.S. Pat. No. 3,329,657.

Polyamine 6

(a) 1,000 g of a 30% strength aqueous solution of a polyamide-polyamine manufactured from 1.05 mol of diethylenetriamine, 1.0 mol of adipic acid and 0.5 mol of ε-caprolactam (viscosity: 24 cP at 25° C.; equivalent: 758) are treated with 210 g of water and 7.4 g of epichlorohydrin (0.061 mol/amine-equivalent) at room temperature, whilst stirring, and thereafter the mixture was warmed to 70° C. until the viscosity no longer rises (about 7 hours). The 25% strength solution, thus obtained, of the reaction product formed has a viscosity of about 900 cP at 25° C.

(b) 1,217.4 g of this 25% strength polyamide-polyamine solution are treated with 38.35 g of sodium chloroacetate (0.25 mol/equivalent) at 70° C. and the mixture is stirred at this temperature and a pH-value of about 9.0 until the sodium chloroacetate has been quantitatively converted. In order to maintain the pH-value at 9.0 it is necessary to add 31 g of 50% strength potassium hydroxide solution. The solution of the polyamide-polyamine containing acid groups is adjusted to 20% strength by adding 235 g of water. It has a viscosity of 432 cP at 25° C.

Polyamine 7

1,217.4 g of the 25% strength polyamide-polyamine solution described under polyamine (6a) are mixed with 229 ml of water and 75 g of sodium 2-acrylamido-2,2-dimethylethanesulphonate (0.25 mol/equivalent) and the mixture is stirred for 10 hours at 60° C. The 20% strength aqueous solution thus obtained has a viscosity of 465 cP at 25° C.

Polyamine 8

1,217.4 g of the 25% strength polyamide-polyamine solution described under polyamine (6a) are mixed with 273 ml of water and 31 g of sodium acrylate (0.25 mol/equivalent) and the mixture is stirred for 12 hours at 50° C. The 20% strength aqueous solution thus obtained has a viscosity of 459 cP at 25° C.

Polyamine 9

1,217.4 g of the 25% strength polyamide-polyamine solution described under polyamine (6a) are stirred for 10 hours at 65° C. with 21 g of itaconic acid (0.125 mol), 36 g of 50% strength potassium hydroxide solution and 247 ml of water. The 20% strength solution thus obtained has a viscosity of 471 cP at 25° C.

Polyamine 10

1,217.4 g of the 25% strength polyamide-polyamine solution described under polyamine (6a) are mixed with 175 ml of water and 129 g of a 33% strength aqueous solution of sodium vinylsulphonate (0.25 mol/equivalent) and the mixture is stirred for 4 hours at 75° C. The 20% strength aqueous solution thus obtained has a viscosity of 502 cP at 25° C.

Polyamine 11

200 ml of water are added to 1,217.4 g of the 25% strength polyamide-polyamine solution described under polyamine (6a) and thereafter 40.2 of propanesultone (0.25 mol/equivalent) are slowly added at room temperature, whilst stirring. The temperature is then raised to 60° C. and the mixture is stirred at this temperature for a further 12 hours, whilst adding sufficient 50% strength KOH to prevent the pH-value from falling below 8.5 to 9.0; 31 g are required for this purpose. The solution of the polyamide-polyamine is adjusted to 20% strength by adding 33 g of water. It has a viscosity of 487 cP at 25° C.

Polyamine 12

1,217.4 g of the 25% strength polyamide-polyamine solution described under polyamine (6a) are stirred for 10 hours at 65° C. with 38 g of maleic acid (0.25 mol), 72 g of 50% strength potassium hydroxide solution and 194 ml of water. The 20% strength solution thus obtained has a viscosity of 503 cP at 25° C.

Polyamine 13

300 g of the 30% strength aqueous solution of a polyethylenepolyamine manufactured from 1 mol of tetraethylene-pentamine and 1.3 mols of 1,2-dichloroethane, having a viscosity of 1,320 cP at 25° C. and a pH-value of 9.0, are mixed with 36 g of acrylic acid (0.25 mol/equivalent), 18 g of 50% strength potassium hydroxide solution and 96 ml of water and the solution is subsequently stirred for 12 hours at 60° C. The 20% strength solution thus prepared has a viscosity of 402 cP at 25° C.

Polyamine 14

300 g of a 30% strength aqueous solution of a polyethylenepolyamine manufactured from 1 mol of tetraethylenepentamine and 1.3 mols of 1,2-dichloroethane, having a viscosity of 1,320 cP at 25° C. and a pH-value of 9.0, are treated with 105 g of sodium chloroacetate (0.25 mol/equivalent) and the solution is stirred for 8 hours at 75° C., adding 65 g of a 45% strength sodium hydroxide solution after the first hour. The viscosity of the 20% strength solution is 475 cP at 25° C.

Comparison Product III

Comparison Product III, which in contrast to the polyamines 13 and 14 does not contain any acid groups, corresponds to the starting polyethylenepolyamine from 1 mol of tetraethylenepentamine and 1.3 mols of 1,2-dichloroethane, used in the manufacture of the polyamines 13 and 14, except that the 30% strength aqueous solution was diluted to 20% content. This 20% strength solution has a viscosity of 330 cP at 25° C. The polyethylenepolyamine was manufactured according to DBP 897,105.

Polyamine 15

300 g of the 25% strength aqueous solution of a polyethylenepolyamine manufactured from 1.0 mol of diethylenetriamine and 1.65 mols of epichlorohydrin, having a viscosity of 625 cP at 25° C. and a pH-value of 8.5, are treated with 33 g of sodium chloroacetate (0.25 mol/equivalent) and the solution is stirred for a total of 15 hours at 60° C. Care is taken, through adding 50% strength potassium hydroxide solution, that the pH-value does not fall below 8.5 during the reaction (requisite amount: 19 g). The solution of the polyethylenepolyamine is adjusted to 20% strength by adding 23 ml of water. Its viscosity is 382 cP at 25° C.

Comparison Product IV

Comparison Product IV, which in contrast to the polyamine 15 does not contain any acid groups, corresponds to the polyalkylenepolyamine from 1.0 mol of diethylenetriamine and 1.65 mols of epichlorohydrin used in the manufacture of the polyamine 15, except that the 25% strength aqueous solution was diluted to a 20% content. The viscosity of this 20% strength solution is 312 cP at 25° C. The product was manufactured according to U.S. Pat. No. 2,969,302.

Polyamine 16

300 g of a 30% strength aqueous solution of a polyethyleneimine obtained by polymerisation of ethyleneimine (viscosity: 925 cP at 25° C.) are treated with 31 g of sodium chloroacetate (0.125 mol/equivalent) and the solution is stirred for a total of 15 hours at 60° C. Care is taken, through adding 50% strength potassium hydroxide solution, to ensure that the pH-value does not drop below 8.5 during the reaction; 15 g are required for this purpose. The solution of the polyethyleneimine is adjusted to 20% strength by adding 104 ml of water. The viscosity is 342 cP at 25° C.

Comparison Product V

Comparison Product V, which in contrast to the polyamine 16 does not contain any carboxyl groups, corresponds to the starting polyethyleneimine used in the manufacture of polyamine 16 except that the 30% strength aqueous solution was diluted to a content of 20%. This 20% strength solution has a viscosity of 287 cP at 25° C. The product was manufactured according to DBP No. 872,269.

Polyamine 17

130 g of a 33% strength aqueous solution of sodium vinylsulphonate (0.33 mol) are added to a solution of 145 g of bis-(3-aminopropyl)-methylamine (1 mol) in 290 ml of water and the mixture is heated to 70° C. for 10 hours. After cooling to room temperature, 80.5 g of epichlorohydrin (0.87 mol) are added to this solution over the course of one hour, whilst stirring. The temperature of the reaction mixture is then raised to 40° C. over the course of half an hour and the mixture is further stirred at this temperature until the viscosity has risen to about 70 cP (about 2½ hours). Thereafter 145 ml of water are added to the reaction mixture, whereby the viscosity drops to about 40 cP. The mixture is now warmed at 40° C. until the viscosity has risen to about 100 cP (about 3½ hours, calculated from the addition of the 145 ml of water). Thereafter, a further 113 ml of water are added to the solution. The solution prepared in this way is of 25% strength and has a viscosity of 155 cP at 25° C.

Comparison Product VI

Comparison Product VI, which in contrast to the polyamine 17 does not contain any sulphonic acid groups, was manufactured analogously to polyamine 17 but without the conjoint use of sodium vinylsulphonate, that is to say according to DAS No. 1,211,922, Example 1. The 25% strength aqueous solution had a viscosity of 145 cP at 25° C.

EXAMPLE 1

100 parts by weight of bleached softwood sulphite cellulose 20 parts by weight of china clay 0.2 parts by weight of a commercially available whitener 1 parts by weight of a commercially available 50% strength resin size 3 parts by weight of $Al_2(SO_4)_3 \times 18\ H_2O$ are mixed with 30,000 parts by weight of water in a mixing vat which precedes a Fourdrinier paper machine (Kämmerer type). The contents of the vat are passed to the Fourdrinier machine via a stuff box at such speed as to produce a paper weighing 80 g/m².

At the stuff box, an aqueous solution of 15 parts by weight of water and 0.15 part by weight of the 20% strength aqueous solution of the polyamide of which the manufacture is described above under Polyamine 1b, is continuously added to the papermaking machine by means of a metering pump. The addition of the auxiliary results in excellent retention of the fine fibres and fillers.

than when using the previously known commercially available cationic retention agents.

If the 20% strength aqueous solution of the polyamine 1b is replaced by the same amount of the aqueous solution, also of 20% strength, of the polyamines (2b), (3b) (4b), (5b), (6b) and 7–12 described above, equivalent retention of the fine fibres and pigments is achieved. The papers again have an excellent degree of whiteness.

The Tables 1-3 which follow illustrate the technical advance brought about by the polyamines, containing acid groups, 1b, 2b, 3b, 6b and 7 to 12 or 4b and 5, according to the invention, as compared to the corresponding compounds free of acid groups (I according to BE No. 736,162; II according to U.S. Pat. No. 3,329,657).

As a measure of the retention action, the tables give the ash content of the paper and the residue found in the effluent. The degree of whiteness was computed with the Elrepho instrument of Messrs. C. Zeiss, from the formula $$\text{degree of whiteness} = R_y - 3(R_x - R_z)$$

$R_x$, $R_y$ and $R_z$ are here the measured reflections of the standard colour values x, y and z. Magnesium oxide powder served as the white standard.

Table 1

Retention Action of the Polyamines 1b, 2b and 3b in Comparison to that of the Corresponding Comparison Product I which is Free of Acid Groups

| Polyamine or Comparison Product | Mol of Acid/ Equivalent | Ash Content of the Paper in % by Weight | Dry Residue in the Effluent, in g/liter. | Degree of Whiteness of the Paper |
|---|---|---|---|---|
| none | — | 8.1 | 0.493 | 110.12 |
| 1b | 0.25 | 12.9 | 0.182 | 103.67 |
| 2b | 0.50 | 13.0 | 0.198 | 103.84 |
| 3b | 0.75 | 12.7 | 0.231 | 104.07 |
| I | 0 | 12.4 | 0.244 | 102.83 |

Table 2

Retention action of the polyamines 4b and 5 in comparison to that of corresponding comparison product II which is free of acid groups

| Polyamine or Comparison Product | Mol of Acid/equivalent | Chain Lengthening Agent | Ash Content of the Paper in % by Weight | Dry Residue in the Effluent in g/liter | Degree of Whiteness of the Paper |
|---|---|---|---|---|---|
| none | — | — | 8.1 | 0.493 | 110.12 |
| 4b | 0.35 | Epichlorohydrin | 13.4 | 0.156 | 102.87 |
| 5 | 0.35 | 1,2-Dichloroethane | 13.6 | 0.169 | 102.53 |
| II | 0 | — | 12.2 | 0.272 | 101.14 |

Furthermore, the effect of the whiteners is impaired less

Table 3

Retention Action of the Polyamines 6b and 7 to 12, Possessing Different Acid Radicals, in Comparison to that of the Comparison Product I which is Free of Acid Groups.

| Polyamine | Acid Group of the Polyamine | Mol of Acid Group/Equivalent | Ash Content of the Paper in % by Weight | Dry Residue in the Effluent in g/liter | Degree of Whiteness of the Paper |
|---|---|---|---|---|---|
| none | — | — | 8.1 | 0.493 | 110.12 |
| 6b | $CH_2COOH$ | 0.25 | 13.0 | 0.175 | 103.87 |
| 7 | $-CH_2-CH_2-CONH-\underset{\underset{CH_3}{\vert}}{\overset{\overset{CH_3}{\vert}}{C}}-CH_2SO_3H$ | " | 12.9 | 0.190 | 103.64 |
| 8 | $-CH_2-CH_2-COOH$ | 0.25 | 12.7 | 0.186 | 103.77 |
| 9 | $-CH_2-\underset{\underset{CH_2-COOH}{\vert}}{CH}-COOH$ | 0.25 | 12.8 | 0.200 | 103.85 |
| 10 | $-CH_2-CH_2-SO_3H$ | 0.25 | 13.0 | 0.208 | 103.37 |
| 11 | $-(CH_2)_3-SO_3H$ | 0.25 | 12.7 | 0.191 | 103.42 |

Table 3-continued

Retention Action of the Polyamines 6b and 7 to 12, Possessing Different Acid Radicals, in Comparison to that of the Comparison Product I which is Free of Acid Groups.

| Polyamine | Acid Group of the Polyamine | Mol of Acid Group/Equivalent | Ash Content of the Paper in % by Weight | Dry Residue in the Effluent in g/liter | Degree of Whiteness of the Paper |
|---|---|---|---|---|---|
| 12 | —CH—COOH<br>     \|<br>     CH$_2$—COOH | 0.25 | 12.8 | 0.210 | 103.81 |
| I | 0 | 0 | 12.4 | 0.244 | 102.83 |

EXAMPLE 2

200 kg of an 0.5% strength aqueous suspension of a paper raw material consisting of
- 40 parts by weight of bleached sulphite cellulose
- 30 parts by weight of bleached straw cellulose
- 30 parts by weight of bleached sulphate cellulose
- 12 parts by weight of china clay.
- 2 parts by weight of starch
- 1.5 parts by weight of a commercially available strengthened resin size
- 0.2 parts by weight of a commercially available whitener
- 3 parts by weight of Al$_2$(SO$_4$)$_3 \times$ 18 H$_2$O are converted on a laboratory papermaking machine, with continuous metering in of 150 g of water which contains 1.5 g of the 20% strength aqueous solution of which the preparation is described above under Polyamine 13, to give paper weighing 80 g/m$^2$. Excellent retention of fine fibres and china clay is achieved with the aid of the added reaction product.

If the 20% strength aqueous solution of the polyamine 13 is replaced by the same amount of one of the 20% strength aqueous solutions of the polyamines 14 and 17 described above, an equivalent retention of the fine fibres and pigments is achieved.

Table 4 which follows illustrates the technical advance achieved with the polyamines containing acid groups, according to the invention, as contrasted with the corresponding comparison products III to VI which are free of acid groups (III according to DBP No. 897,015; IV according to U.S. Pat. No. 2,969,302; V according to DBP No. 872,269; VI according to DBP No. 1,211,922).

As a measure of the retention action, the table gives the ash content of the paper and the residue found in the effluent. The degree of whiteness was determined as indicated in Example 1.

EXAMPLE 3

The effluents which arise in the manufacture of sized or unsized loaded wrapping paper (with waste paper as the raw material), and which have a pH-value of 4.5 to 4.8 or 7.0 to 7.3 are treated, before entering the flotation pulp trap, with 1.5 g of the 20% strength aqueous solution of the product of which the manufacture is described above under polyamine 1, per 1 cbm of effluent. In both cases an excellent clarifying action is achieved; the solids content in the effluent is reduced from about 1,500 mg/l to 20–25 mg/l. The clarified water obtained can be further used as diluent water in the manufacture of optically brightened papers.

If instead of the polyamide 1 the comparison product I is employed, the solids content in the effluent is only reduced to 30–35 mg/l.

We claim:

1. In the process for making paper in which an auxiliary is added to the pulp prior to passage of the pulp to the papermaking machine or to papermaking machine effluents for increasing fiber, filler and pigment retention or for assisting working up papermaking machine effluents by filtration, sedimentation or flotation; the improvement which comprises using as said auxiliary an effective amount of a water-soluble modified polyamide-amine having an average molecular weight of above 1,000 and containing at least one —R—Z group bonded to a basic nitrogen in which Z is —COOH or —SO$_3$H; and
R is alkylene of 1 to 7 carbon atoms, alkylene of 1 to 7 carbon atoms substituted by carbonamido, or alkylene of 1 to 7 carbon atoms interrupted by carbonamido; in which 0.05 to 0.9 equivalents of the basic amino groups in said polyamide-amine are converted to said —R—Z groups.

2. Processa of claim 1 in which said auxiliary is the product of

Table 4

Retention Action of Polyethyleneimines or Polyalkyleneamines (Polyamines 13 to 17), Containing Acid Groups, Contrasted with the Comparison Products III-VI which are Free of Acid Groups

| Polyamine or Comparison Product | Acid Group | Mol of Acid Group/Equivalent | Ash Content of the Paper in % by Weight | Dry Residue in the Effluent in g/liter | Degree of Whiteness of the Paper |
|---|---|---|---|---|---|
| 13 | —CH$_2$=CH—COOH | 0.25 | 9.0 | 0.203 | 95.92 |
| 14 | —CH$_2$COOH | 0.45 | 8.7 | 0.211 | 96.57 |
| III | 0 | 0 | 8.5 | 0.231 | 95.27 |
| 15 | —CH$_2$COOH | 0.25 | 8.8 | 0.229 | 96.82 |
| IV | 0 | 0 | 8.3 | 0.256 | 95.76 |
| 16 | —CH$_2$COOH | 0.125 | 8.9 | 0.192 | 94.83 |
| V | 0 | 0 | 8.6 | 0.223 | 94.08 |
| 17 | —CH$_2$—CH$_2$—SO$_3$H | 0.33 | 8.3 | 0.231 | 97.32 |
| VI | 0 | 0 | 8.1 | 0.276 | 96.28 |
| without auxiliary | — | — | 5.9 | 0.423 | 106.17 |

(a) reaction of a water-soluble low molecular weight polyamide-amine having an average molecular weight of less than 10,000; or a water-soluble higher molecular weight polyamide-amine having an average molecular weight of more than 10,000 and an amine equivalent of 43 to 700, in which a hydrogen atom is bonded to at least every twentieth basic nitrogen atom; with (b) a compound which introduces —COOH or —SO$_3$H acid groups.

3. Process of claim 2 in which said compound which introduces —COOH or —SO$_3$H acid groups is selected from the class consisting of alkanesultones, α,β-unsaturated mono- and dicarboxylic acids, derivatives of said α,β-unsaturated acids acids which contain acid groups, 1-halogeno-fatty acids and 2-halogeno-fatty acids.

4. Process of claim 3 in which said compound which introduces —COOH or —SO$_3$H acid groups is selected from the class consisting of propanesultone, butanesultone, vinylsulphonic acid, acrylic acid, methacrylic acid, maleic acid, itaconic acid, 2-acrylamido-2,2-dimethylethanesulphonic acid, 2-chloro-propionic acid and chloroacetic acid.

5. Process of claim 1 in which said auxiliary is further reacted with a compound which is polyfunctional toward amino groups.

6. Process of claim 1 in which said auxiliary is further reacted with a compound which is polyfunctional toward amino groups and is selected from the group consisting of α,ω-alkanedihalides, ω,ω'-dihalogenoethers, halogenohydrins, epihalogenohydrins, bis-epoxy compounds, ω-halogenocarboxylic acid halides and glycidyl-ethers of polyalkylene oxides.

7. Process of claim 1 for making paper in which an auxiliary is added prior to papermaking for increasing fiber, filler or pigment retention.

8. Process of claim 1 for working up paper-making machine effluents by adding auxiliary after papermaking.

9. Process of claim 1 in which 5 to 90% of the basic nitrogen atoms in said auxiliary are substituted by the —R—Z grouping.

10. Process of claim 1 in which 5 to 60% of the basic nitrogen atoms in said auxiliary are substituted by the grouping —R—Z.

11. Process of claim 1 in which 15 to 60% of the basic nitrogen atoms in said auxiliary are substituted by the —R—Z grouping.

12. Process of claim 1 in which in the grouping —R—Z, R represents $C_1$–$C_5$-alkylene; $C_1$–$C_5$ alkylene substituted by one or more members selected from the group consisting of methyl, and carboxyl; or $C_1$–$C_5$-alkylene interrupted by a carbonamide group.

13. Process of claim 1 in which —R—Z is

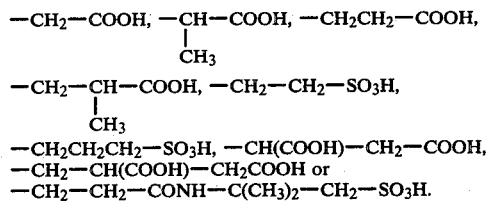

14. Process of claim 1 in which Z is —COOH.

* * * * *